United States Patent
Chung et al.

(10) Patent No.: US 10,217,989 B2
(45) Date of Patent: Feb. 26, 2019

(54) POUCH-TYPE SECONDARY BATTERY CONTAINING ELECTROLYTE HOLDING PART

(71) Applicant: LG Chem, Ltd., Daejeon (KR)

(72) Inventors: Joo Young Chung, Daejeon (KR); In Gu An, Daejeon (KR); Jae Han Jung, Daejeon (KR)

(73) Assignee: LG Chem, Ltd., Daejeon (KR)

( * ) Notice: Subject to any disclaimer, the term of this patent is extended or adjusted under 35 U.S.C. 154(b) by 0 days.

(21) Appl. No.: 15/827,899

(22) Filed: Nov. 30, 2017

(65) Prior Publication Data
US 2018/0159112 A1    Jun. 7, 2018

(30) Foreign Application Priority Data

Dec. 1, 2016 (KR) .................. 10-2016-0162954

(51) Int. Cl.
| | | |
|---|---|---|
| *H01M 4/00* | (2006.01) | |
| *H01M 2/36* | (2006.01) | |
| *H01M 10/04* | (2006.01) | |
| *H01M 2/02* | (2006.01) | |
| *H01M 2/26* | (2006.01) | |
| *H01M 10/42* | (2006.01) | |
| *H01M 2/38* | (2006.01) | |
| *H01M 2/10* | (2006.01) | |
| *H01M 10/052* | (2010.01) | |

(52) U.S. Cl.
CPC ............ *H01M 2/36* (2013.01); *H01M 2/021* (2013.01); *H01M 2/0212* (2013.01); *H01M 2/0275* (2013.01); *H01M 2/1077* (2013.01); *H01M 2/266* (2013.01); *H01M 2/38* (2013.01); *H01M 10/0413* (2013.01); *H01M 10/0436* (2013.01); *H01M 10/42* (2013.01); *H01M 2/0287* (2013.01); *H01M 10/052* (2013.01); *H01M 2220/30* (2013.01)

(58) Field of Classification Search
CPC ..................................................... H01M 4/00
See application file for complete search history.

(56) References Cited

FOREIGN PATENT DOCUMENTS

| KR | 10-2012-0069297 A | | 6/2012 |
|---|---|---|---|
| KR | 10-2013-0038655 A | | 4/2013 |
| KR | 10-2013-0106796 | * | 9/2013 |
| KR | 10-2013-0106796 A | | 9/2013 |

* cited by examiner

*Primary Examiner* — Jacob B Marks
(74) *Attorney, Agent, or Firm* — Mintz Levin Cohn Ferris Glovsky and Popeo, P.C.; Kongsik Kim; Carolina Säve

(57) ABSTRACT

A secondary battery is provided. The secondary battery includes an electrode assembly that is sealed in a receiving portion of a pouch-type battery case together with an electrolyte. The pouch-type battery case is formed from a laminate sheet having an exterior coating layer, a metal layer and an interior adhesive layer. Additionally, electrolyte holding portion for replenishing an electrolyte that is depleted during the manufacturing process or the use of the secondary battery is disposed in the laminate sheet, without contacting the electrolyte disposed in the receiving portion of the pouch-type battery case.

13 Claims, 5 Drawing Sheets

FIG. 5

POUCH-TYPE SECONDARY BATTERY CONTAINING ELECTROLYTE HOLDING PART

CROSS-REFERENCE TO RELATED APPLICATION

This application claims priority to Korean Patent Application No. 10-2016-0162954, filed on Dec. 1, 2016, the disclosure of which is incorporated herein by reference in its entirety.

TECHNICAL FIELD

The present disclosure relates to a pouch-type secondary battery containing an electrolyte holding portion, and more particularly, to an electrolyte holding portion that has a heat-variable layer contained in a battery case

RELATED ART

Recently, technological development and increased demand for mobile equipment has led to a rapid increase in the demand for secondary batteries as energy sources. Among these secondary batteries, lithium secondary batteries having a high energy density and operating voltage, a long life and a low self-discharge rate are commercially available and widely used. Further, there an increased demand for miniaturization and thickness reduction of the secondary battery due to the development trend of multi-function miniaturized wearable devices and portable devices. Additionally, to enable a long-term use of secondary batteries, research has been conducted concerning various aspects to increase the capacity of secondary batteries or develop a secondary battery having a high capacity retention rate.

Generally, a pouch-type battery refers to a battery having an electrode assembly and an electrolyte sealed in a pouch-type case of a laminate sheet having an exterior resin layer, a metal layer, and an interior adhesive layer. The laminate sheet is sealed by thermal compression thereof except a portion of the exterior periphery of an electrode assembly receiving portion, when an electrode assembly is accommodated therein. An electrolyte is injected through the unsealed portion, and then an activation process and a degassing process are performed. However, the secondary battery degrades due to charging and discharging, and the battery life decreases as the electrolyte is depleted. Further, since an electrolytic is removed during the degassing process, when the amount of the electrolyte initially injected is sufficient, a sufficient amount of electrolyte cannot be supplied due to the consumption or removal of the electrolyte during the manufacturing process, resulting in deterioration of the life characteristics of the battery.

In order to solve these problems, a secondary battery having a structure in which an auxiliary bag containing a replenishing electrolyte is added to the exterior circumferential surface of a battery case has been proposed. However, an auxiliary bag increases the overall size of the battery cell, which makes it difficult to apply it to small devices or leads to a relatively decreased capacity. Further, an auxiliary bag requires a separate passage to accommodate an electrolyte flow. Accordingly, there is a need for a technology capable of replenishing an electrolyte that is depleted during the manufacturing process or the use of a secondary battery, with a simple process, without increasing the overall size of the battery cell.

The above information disclosed in this section is merely for enhancement of understanding of the background of the disclosure and therefore it may contain information that does not form the prior art that is already known in this country to a person of ordinary skill in the art.

SUMMARY

In an aspect of an exemplary embodiment of the present disclosure, a secondary battery, may include an electrode assembly that is sealed in a receiving portion of a pouch-type battery case together with an electrolyte. The battery case may be formed from a laminate sheet having an exterior coating layer, a metal layer and an interior adhesive layer. The secondary battery may include an electrolyte holding portion for replenishing an electrolyte that is depleted during the manufacturing process or the use of the secondary battery is contained in the laminate sheet, without contacting the electrolyte disposed in the receiving portion of the battery case.

In some exemplary embodiments, the electrolyte holding portion may supply an electrolyte to the receiving portion of the battery case from heat applied during the manufacturing or from use of the secondary battery. The electrolyte holding portion may include a heat-variable layer, in contact with the receiving portion of the battery case and partially melted or phase-transformed by applied heat to release a liquid component and a replenishing electrolyte may be disposed between the heat-variable layer and the interior adhesive layer of the laminate sheet.

In other exemplary embodiments, the heat-variable layer may release a replenishing electrolyte through phase transformation involving a glass transition by applying heat. The secondary battery may include the heat-variable layer formed from an amorphous thermoplastic polymer resin having a glass transition temperature (Tg) in the range of about 60 to about 90 degrees Celsius. The amorphous thermoplastic polymer resin may be at least one selected from the group consisting of polyvinyl chloride (PVC), polyethylene terephthalate (PET), poly(cis-1,4-isoprene), and poly(trans-1,4-isoprene).

In another exemplary embodiment, the secondary battery may include sealing portion formed by thermal bonding is formed in the exterior periphery of the receiving portion; and the electrolyte holding portion may be formed in the interior side portion of the battery case disposed in the receiving portion. The electrolyte holding portion may be formed on the upper interior side and/or the lower interior side of the battery case disposed in the receiving portion.

In another aspect of an exemplary embodiment of the present disclosure, a method of manufacturing the secondary battery may include forming an electrolyte holding portion on one side of a laminate sheet having an exterior coating layer, a metal layer and an interior adhesive layer, shaping the laminate to dispose the electrolyte holding portion on a receiving portion and mounting an electrode assembly in the receiving portion, thermally bonding the exterior periphery of the receiving portion to form a sealing portion, injecting an electrolyte into the receiving portion, and activating and degassing the electrolyte and applying heat to supply an electrolyte into the receiving portion through the electrolyte holding portion.

In other exemplary embodiments of the present disclosure, thermally bonding may include forming the sealing portion by thermally bonding the exterior periphery of the receiving portion excluding a portion thereof, and an electrolyte may be injected through the unsealed exterior periphery to perform activation and the gas generated during the activation process may be removed, and then the exterior periphery may be sealed. The application of heat may be performed during the manufacturing process of the secondary battery. The application of heat may be performed after the secondary battery is removed from the factory.

In some exemplary embodiments, a battery pack may include the secondary battery as a unit cell.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Hereinafter, exemplary embodiments of the present disclosure will be described with reference to the accompanying drawings. However, the description provided herein is for better understanding of the present disclosure, and the scope of the present disclosure is not limited thereto. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure has been made to solve the above problems and other technical problems that have yet to be resolved. As a result of a variety of extensive and intensive studies and experiments, the inventors of the present application have found that, as explained below, in the case where a secondary battery is used having a structure in which an electrolyte holding portion comprising a heat-variable layer may be disposed in a battery case, it is possible to replenish the depleted electrolyte by applying heat to the secondary battery during the manufacturing process or the use of the secondary battery, which increases the life of the secondary battery.

In order to achieve the above object, the present disclosure provides a secondary battery that may include an electrode assembly sealed in a receiving portion of a pouch-type battery case together with an electrolyte The battery case may be formed from of a laminate sheet having an exterior coating layer, a metal layer and an interior adhesive layer; and an electrolyte holding portion for replenishing an electrolyte that is depleted during the manufacturing process or the use of the secondary battery may be disposed in the laminate sheet, without contacting the electrolyte disposed in the receiving portion of the battery case.

As described above, the secondary battery according to the present disclosure may include a structure in which an electrolyte holding portion having a replenishing electrolyte is disposed in a laminate sheet forming a battery case, which makes it possible to replenish an additional electrolyte during the manufacturing process or the use of the secondary battery. Additionally, the electrolyte contained in the electrolyte holding portion may be disposed to prevent contact with the electrolyte disposed in the receiving portion of the case together with an electrode assembly, and thus may be completely separated therefrom. Therefore, when an electrolyte is discharged along with the discharged gas during the degassing process, an additional electrolyte may be replenished thereafter. Further, since the present disclosure provides a structure in which an electrolyte holding portion is contained in a laminate sheet, a separate electrolyte receiving member, etc. is not required which prevents the increase of the volume of the battery cell.

The electrolyte holding portion may be a structure for replenishing an electrolyte that is depleted during the manufacturing process or the use of the secondary battery, and may be a structure for supplying an electrolyte to the receiving portion of the battery case through heat applied to the electrolyte holding portion. In particular, the electrolyte holding portion may be a structure which includes a heat-variable layer in contact with the receiving portion of the battery case and which may be partially melted or phase-transformed by applied heat to release a liquid component and a replenishing electrolyte disposed between the heat-variable layer and the interior adhesive layer of the laminate sheet. Therefore, when the battery case is heated to apply heat to the electrolyte holding portion, the heat-variable layer of the electrolyte holding portion may be partially melted or phase-transformed to flow. Accordingly, the replenishing electrolyte disposed between the heat-variable layer and the interior adhesive layer of the laminate sheet may move to the receiving portion to replenish the depleted electrolyte.

The heat-variable layer may release a replenishing electrolyte through phase transformation involving a glass transition by applied heat. For example, the heat-variable layer may be formed from of an amorphous thermoplastic polymer resin having a glass transition temperature (Tg) in the range of about 60 to about 90 degrees Celsius, specifically, a glass transition temperature in the range of about 70 to about 90 degrees Celsius. When the glass transition temperature is less than about 60 degrees, the heat-variable layer may be melted in a normal use environment of the secondary battery, and a replenishing electrolyte may be added earlier than the time when the electrolyte needs to be replenished. When the glass transition temperature is greater than about 90 degrees, the interior adhesive layer of the sealing portion may be melted, leading to a reduced sealing ability.

The amorphous thermoplastic polymer resin is not particularly limited provided it is a polymer resin which does not chemically react with an electrolyte and which has a glass transition temperature within the above range. However, for example, it may be at least one selected from the group consisting of polyvinyl chloride (PVC), polyethylene terephthalate (PET), poly(cis-1,4-isoprene), and poly(trans-1,4-isoprene).

Given the electrolyte holding portion is a structure for releasing and replenishing an additional electrolyte to the electrode assembly receiving portion, the structure may be formed on the interior side of the interior adhesive layer of the laminate sheet. However, even when the electrolyte holding portion is formed on the interior side of the interior side of the interior adhesive layer of the laminate sheet, a structure preventing the reduction of the sealing ability of the adhesive layer may be included.

Therefore, the structure may be a sealing portion formed by thermal bonding formed in the exterior periphery of the receiving portion. The electrolyte holding portion may be formed in the interior side portion of the battery case disposed in the receiving portion. In other words, the electrolyte holding portion may be formed in the interior side portion of the battery case excluding the sealing portion, thereby solving the problem of the reduction of the sealing ability of the battery case. For example, the electrolyte holding portion may be formed on the upper interior side and/or the lower interior side of the battery case disposed in the receiving portion. When the electrolyte holding portion is formed on the upper interior side and/or the lower interior side of the receiving portion, the electrolyte to be replenished may be directly added to the surface portion of the electrode coating layer of the electrode assembly parallel to the current collector, which allows for a rapid replenishment of the electrolyte.

The present disclosure may include a method of manufacturing the secondary battery, that may include a process of forming an electrolyte holding portion on one side of a laminate sheet comprising an exterior coating layer, a metal layer and an interior adhesive layer, a process of shaping the laminate sheet to dispose the electrolyte holding portion on a receiving portion and mounting an electrode assembly in the receiving portion, a process of thermally bonding the exterior periphery of the receiving portion to form a sealing portion, injecting an electrolyte into the receiving portion, and activating and degassing the electrolyte and a process of applying heat to further supply an electrolyte into the receiving portion through the electrolyte holding portion.

The secondary battery manufactured by the above method may include the processes of manufacturing a laminate sheet having an electrolyte holding portion formed on one side thereof, and shaping an electrode assembly receiving portion using the laminate sheet having an electrolyte-holding portion formed thereon and mounting an electrode assembly in the receiving portion. This differs from the conventional methods of manufacturing a battery case in that it includes the process of forming an electrolyte holding portion. Accordingly, a separate member to the secondary battery or a process therefor is not added. Thus, the method may allow an electrolyte to be replenished through a simple method. In addition, after the thermal bonding heat may be applied to the battery cell to further supply the electrolyte in the electrolyte holding portion to the receiving portion. This may solve the problem that an electrolyte may depleted during the activation process or that an electrolyte may discharged together with gas during the degassing process so that the amount of the electrolyte becomes insufficient and thus the life characteristics of the battery are deteriorated.

Further, heat may be applied to the secondary battery on the exterior side of the upper side and/or the lower side of the receiving portion thereof. Heat may be sequentially applied to each the upper exterior side and the lower exterior side. Alternatively, heat may be applied simultaneously on the upper exterior side and the lower exterior side. In the thermal bonding, the sealing portion may be formed by thermally bonding the exterior periphery of the receiving portion excluding a portion thereof, an electrolyte may be injected through the unsealed exterior periphery to perform activation, the gas generated during the activation process may be removed, and then the exterior periphery may be completely sealed.

In an exemplary embodiment, considering that the replenishment is to replenish the electrolyte which is depleted during the manufacturing process or the use of the secondary battery, the application of heat of the process to apply heat to further supply an electrolyte into the receiving portion may be performed during the manufacturing process of the secondary battery to replenish the electrolyte depleted or discharged to the outside of the secondary battery during the activation process or the degassing process. Otherwise, the application of heat of the process applying heat to further supply an electrolyte into the receiving portion may be performed after the secondary battery is taken out of the factory, since it is possible to replenish an electrolyte during the use of the secondary battery.

The present disclosure may also provide a battery pack comprising the secondary battery as a unit cell, and a device comprising the battery pack as a power source. The device may be, for example, but not limited to, a notebook computer, a netbook, a tablet PC, a mobile phone, an MP3 player, a wearable electronic device, a power tool, an electric vehicle (EV), a hybrid electric vehicle (HEV), a plug-in hybrid electric vehicle (PHEV), an electric bike (e-bike), an electric scooter (e-scooter), an electric golf cart, or an electric power storage system. Since the structure and manufacturing method of these devices are well known in the art, a detailed description thereof will be omitted herein.

Hereinafter, exemplary embodiments of the present disclosure will be described with reference to the drawings. However, these exemplary embodiments are provided to facilitate understanding of the present disclosure and the scope of the present disclosure is not limited thereto.

Figure 1:
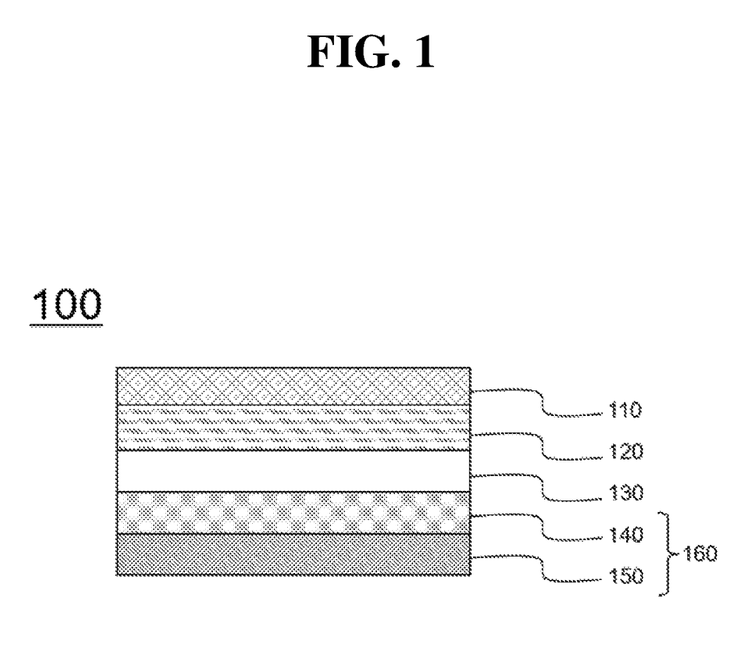
FIG. 1 is an exemplary cross-sectional schematic diagram of a laminate sheet according to an exemplary embodiment of the present disclosure.

FIG. 1 schematically shows a portion of a cross-sectional view of a laminate sheet according to an exemplary embodiment. Referring to FIG. 1, a laminate sheet 100 that forms a battery case of a secondary battery according to the present disclosure may include an exterior resin layer 110, a metal layer 120, and an interior adhesive layer 130. An electrolyte holding portion 160 may be formed on the exterior side of the interior adhesive layer. The electrolyte holding portion 160 may be formed from of a replenishing electrolyte 140 and a heat-variable layer 150 and the replenishing electrolyte 140 may be disposed between the heat-variable layer 150 and the interior adhesive layer 130 of the laminate sheet. Accordingly, when heat is applied to the secondary battery, the heat-variable layer 150 may be melted, so that the replenishing electrolyte 140 held in the interior side of the heat-variable layer 150 may be released to supply the electrolyte to the receiving portion of the battery case.

Figure 2:
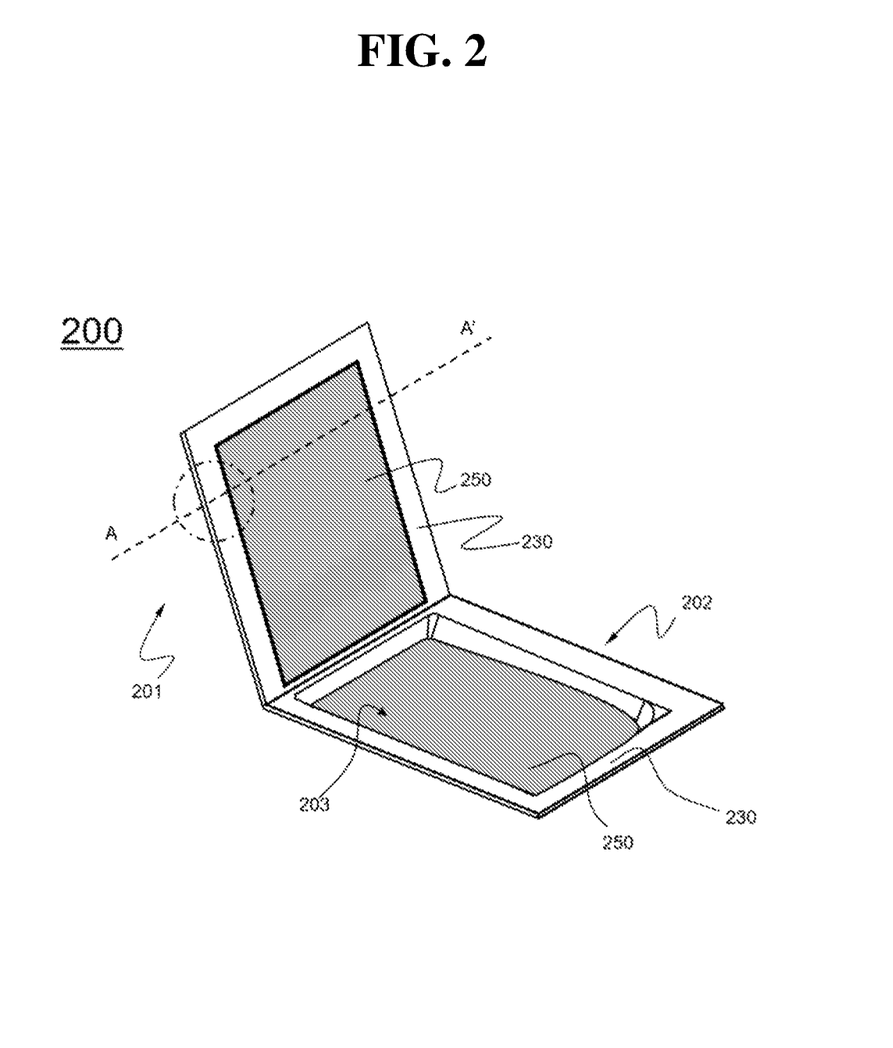
FIG. 2 is an exemplary perspective view of a pouch-type secondary battery according to an exemplary embodiment of the present disclosure.
Figure 3:
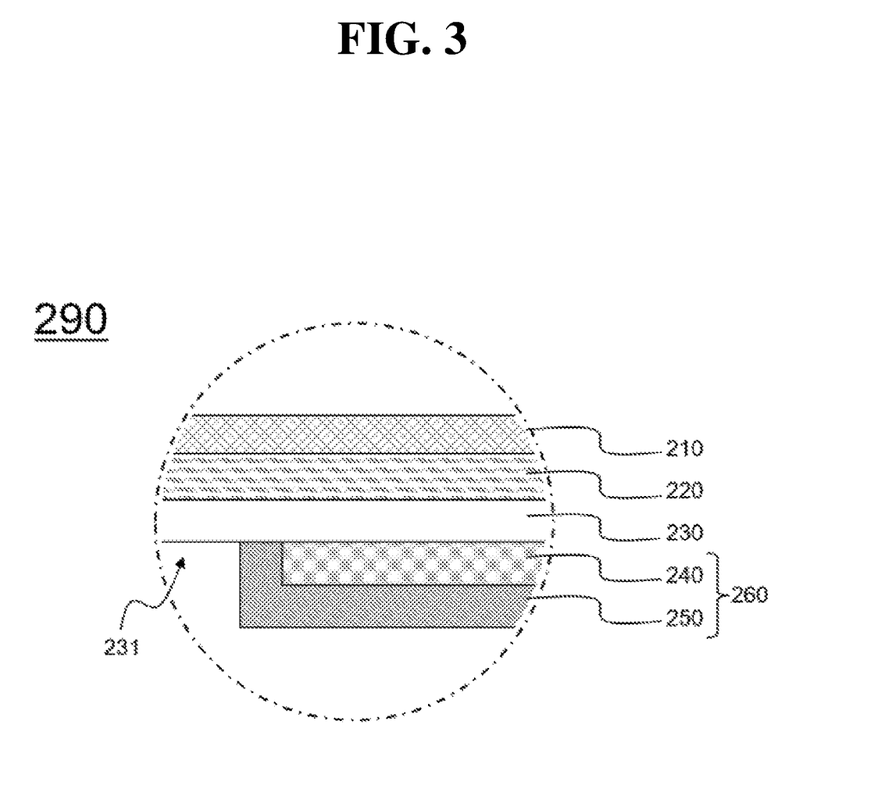
FIG. 3 is an exemplary enlarged view of the cross section of FIG. 2, taken along the line A-A' according to an exemplary embodiment of the present disclosure.

FIG. 2 schematically shows an exemplary perspective view of a pouch-type secondary battery according to an exemplary embodiment. FIG. 3 schematically shows an enlarged cross-sectional view of the battery case of FIG. 2, taken along the line A-A'. Referring to FIG. 2 and FIG. 3, the battery case 200 may include an upper case 201 and a lower case 202, one end of which are connected to each other. An electrode assembly (not shown) receiving portion 203 may be formed in the lower case 202. The battery case 200 may include an electrolyte holding portions 250 and 250 formed on the upper interior side and the lower interior side of the receiving portion 203, respectively, except the portion where a sealing portion 230 may be formed when sealed.

An exterior coating layer 210, a metal layer 220 and an interior adhesive layer 230 in the laminate sheet 290 may be formed on the entire portion of the battery case. However, the electrolyte holding portion 260 may include a replenishing electrolyte 240 and a heat-variable layer 250 may be formed in the portion excluding the sealing portion 231. The replenishing electrolyte 240 may be surrounded by the heat-variable layer 250.

Figure 4:
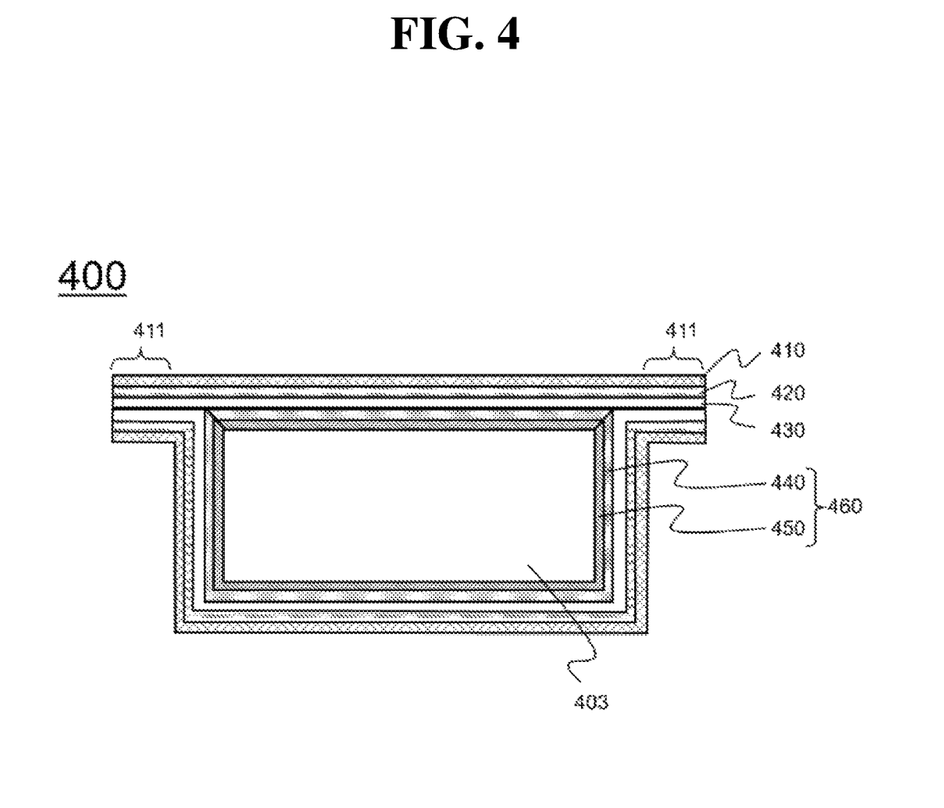
FIG. 4 is an exemplary cross-sectional schematic diagram of a pouch-type secondary battery according to an exemplary embodiment of the present disclosure.

FIG. 4 schematically shows an exemplary cross-section view of a pouch-type secondary battery according to an exemplary embodiment. Referring to FIG. 4, the pouch type secondary battery 400 may be manufactured using the laminate sheet 290 shown in FIG. 3. An exterior coating layer 410, a metal layer 420 and an interior adhesive layer 430 may be formed on the entire portion of the laminate sheet, and an electrolyte holding portion 460 may be formed from a replenishing electrolyte 440 and a heat-variable layer 450 may be formed on the interior side of the portion constituting the receiving portion 403 of the electrode assembly, that is, the battery case disposed in the receiving portion. Therefore, the electrolyte holding portion may be formed on the entire exterior periphery of the rectangular parallelepiped-like electrode assembly receiving portion 403 which constitutes the portion excluding the sealing portion 411 which is an exterior periphery of the receiving portion.

Figure 5:
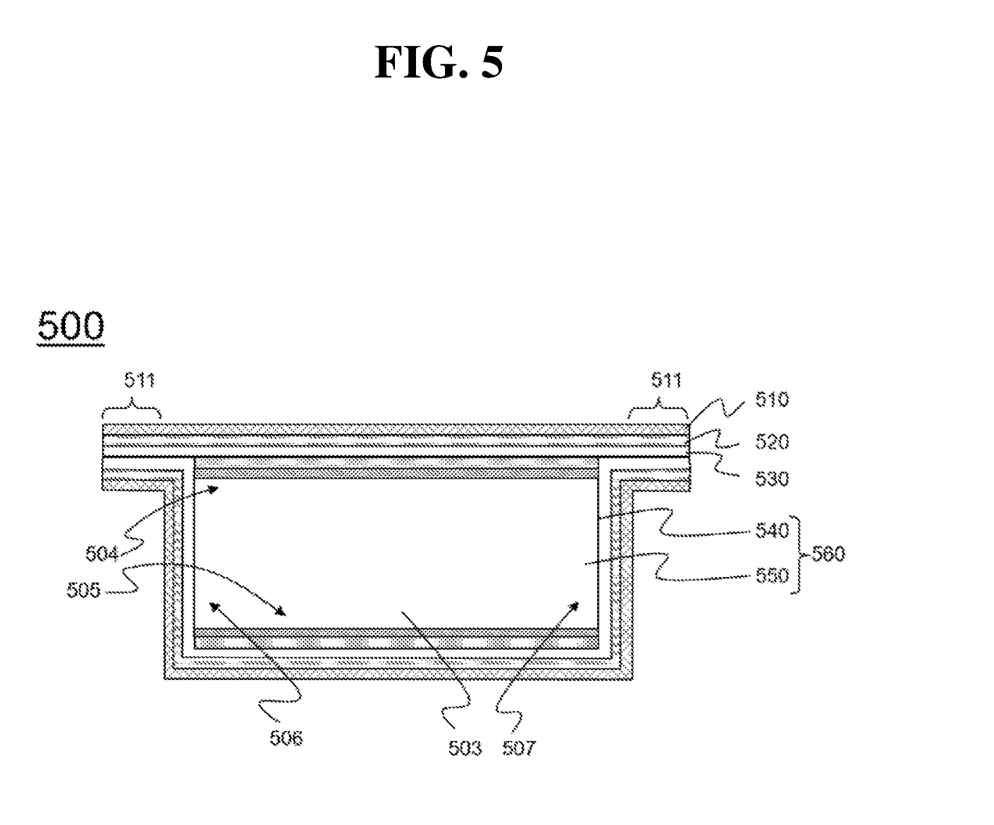
FIG. 5 is an exemplary cross-sectional schematic diagram of a pouch-type secondary battery according to another exemplary embodiment of the present disclosure.

FIG. 5 schematically shows an exemplary cross-sectional view of a pouch-type secondary battery according to an exemplary embodiment. Referring to FIG. 5, an exterior coating layer 510, a metal layer 520 and an interior adhesive layer 530 may be formed on the entire portion of the laminate sheet of the pouch-type secondary battery 500. An electrolyte holding portion 560 composed of a replenishing electrolyte 540 and a heat-variable layer 550 may be formed on the upper (504) interior side and the lower (505) interior side of an electrode assembly receiving portion 503, and an electrolyte holding portion 560 may not formed on the sides 506 and 507 thereof. Therefore, the electrolyte holding portion may be formed in the portion excluding the sealing portion 511, which is an exterior periphery of the receiving portion, and the sides 506 and 507 of the receiving portion.

As described above, the secondary battery according to the present disclosure may have an electrolyte holding portion comprising a heat-variable layer formed on the interior side of an electrode assembly receiving portion. Thus, it is possible to release a replenishing electrolyte by melting the heat-variable layer by applying heat to the secondary battery during the manufacturing process or the use of the secondary battery, which allows to improve the life characteristics of the secondary battery. As described above, the secondary battery according to the present disclosure may include a structure having a heat-variable layer which is partially melted or phase-transformed by heat and a replenishing electrolyte in a laminate sheet for pouch-type battery cases. This allows to replenish an electrolyte by applying heat to the secondary battery during the manufacturing process or the use of the secondary battery.

Therefore, it is possible to solve the problem that as the number of charging/discharging of the secondary battery increases, the electrolyte decreases, resulting in deterioration of the life characteristics of the battery. Additionally, the problem that methods of manufacturing a secondary battery require a process of removing the gas generated in the manufacturing process may be resolved, and thus when an excessive amount of electrolyte is initially injected, the electrolyte may be removed together with gas during the degassing process, so that the necessary amount of electrolyte is not injected.

While the present disclosure has been described with respect to the exemplary embodiments, it will be understood that those skilled in the art may make various changes and modifications without departing from the spirit and scope of the disclosure

What is claimed is:
1. A secondary battery, comprising:
an electrode assembly that is sealed in a receiving portion of a pouch-type battery case together with an electrolyte,
wherein the pouch-type battery case is formed from a laminate sheet having an exterior coating layer, a metal layer and an interior adhesive layer; and
an electrolyte holding portion for replenishing an electrolyte that is depleted during the manufacturing process or the use of the secondary battery is contained in the laminate sheet, without contacting the electrolyte disposed in the receiving portion of the battery case.

2. The secondary battery according to claim 1, wherein the electrolyte holding portion supplies an electrolyte to the receiving portion of the battery case from heat applied during the manufacturing or from use of the secondary battery.

3. The secondary battery according to claim 2, wherein the electrolyte holding portion comprises:
a heat-variable layer, which is in contact with the receiving portion of the battery case and which is partially melted or phase-transformed by applied heat to release a liquid component; and
a replenishing electrolyte disposed between the heat-variable layer and an interior adhesive layer of the laminate sheet.

4. The secondary battery according to claim 3, wherein the heat-variable layer releases a replenishing electrolyte through phase transformation involving a glass transition by applying heat.

5. The secondary battery according to claim 3, wherein the heat-variable layer is formed from an amorphous thermoplastic polymer resin having a glass transition temperature (Tg) in the range of about 60 to about 90 degrees Celsius.

6. The secondary battery according to claim 5, wherein the amorphous thermoplastic polymer resin is at least one selected from the group consisting of polyvinyl chloride (PVC), polyethylene terephthalate (PET), poly(cis-1,4-isoprene), and poly(trans-1,4-isoprene).

7. The secondary battery according to claim 1, wherein a sealing portion formed by thermal bonding is formed in the exterior periphery of the receiving portion; and the electrolyte holding portion is formed in the interior side portion of the battery case disposed in the receiving portion.

8. The secondary battery according to claim 7, wherein the electrolyte holding portion is formed on the upper interior side and/or the lower interior side of the battery case disposed in the receiving portion.

9. A method of manufacturing the secondary battery according to claim 1, comprising:

forming an electrolyte holding portion on one side of a laminate sheet comprising an exterior coating layer, a metal layer and an interior adhesive layer;

shaping the laminate to dispose the electrolyte holding portion on a receiving portion and mounting an electrode assembly in the receiving portion;

thermally bonding the exterior periphery of the receiving portion to form a sealing portion;

injecting an electrolyte into the receiving portion, and activating and degassing the electrolyte; and applying heat to supply the electrolyte into the receiving portion through the electrolyte holding portion.

10. The method according to claim 9, wherein in thermally bonding includes forming the sealing portion by thermally bonding the exterior periphery of the receiving portion excluding a portion thereof, and an electrolyte is injected through the unsealed exterior periphery to perform activation; and the gas generated during the activation process is removed, and then the exterior periphery is sealed.

11. The method according to claim 10, wherein the application of heat is performed during the manufacturing process of the secondary battery.

12. The method according to claim 10, wherein the application of heat is performed after the secondary battery is removed from the factory.

13. A battery pack comprising the secondary battery according to claim 1 as a unit cell.

* * * * *